United States Patent [19]

Lippman et al.

[11] 4,083,923

[45] * Apr. 11, 1978

[54] PROCESS FOR THE PRODUCTION OF ALUMINUM CHLORIDE AND RELATED PRODUCTS

[75] Inventors: Alfred Lippman; Roger Frank Sebenik, both of Metairie, La.

[73] Assignee: Toth Aluminum Corporation, New Orleans, La.

[*] Notice: The portion of the term of this patent subsequent to Feb. 17, 1993, has been disclaimed.

[21] Appl. No.: 651,396

[22] Filed: Jan. 22, 1976

[51] Int. Cl.² .................. C01F 7/58; C01F 7/02
[52] U.S. Cl. ........................ 423/79; 423/135; 423/74; 423/77; 423/149; 423/343; 423/337; 423/136; 423/493; 423/495; 423/210.5; 423/DIG. 12; 55/71; 55/72; 55/84
[58] Field of Search ............ 423/135, 136, 149, 495, 423/493, 210.5, 79; 55/71, 72

[56] References Cited

U.S. PATENT DOCUMENTS

| 2,084,289 | 6/1937 | McAfee et al. | 423/136 |
| 2,533,021 | 12/1950 | Krehma | 55/72 |
| 3,066,010 | 11/1962 | Horning et al. | 423/149 |
| 3,294,482 | 12/1966 | Lerner | 55/72 |
| 3,436,211 | 4/1969 | Deming | 55/72 |
| 3,793,003 | 2/1974 | Othmer | 423/136 |
| 3,938,969 | 2/1976 | Sebenik et al. | 423/495 |

FOREIGN PATENT DOCUMENTS

| 46-12285 | 3/1971 | Japan | 423/495 |

Primary Examiner—Herbert T. Carter
Attorney, Agent, or Firm—Holman & Stern

[57] ABSTRACT

The present invention provides a process for the production of aluminum chloride and alumina of metallurgical grade purity, and valuable by-products from aluminous ores like clay, bauxites and laterites. The process comprises carbo-chlorination of the ore to produce aluminum chloride and other metal chlorides. The aluminum chloride is separated, purified and utilized as such or oxidized to make alumina while the other metal chlorides are processed to recover maximum values.

15 Claims, 1 Drawing Figure

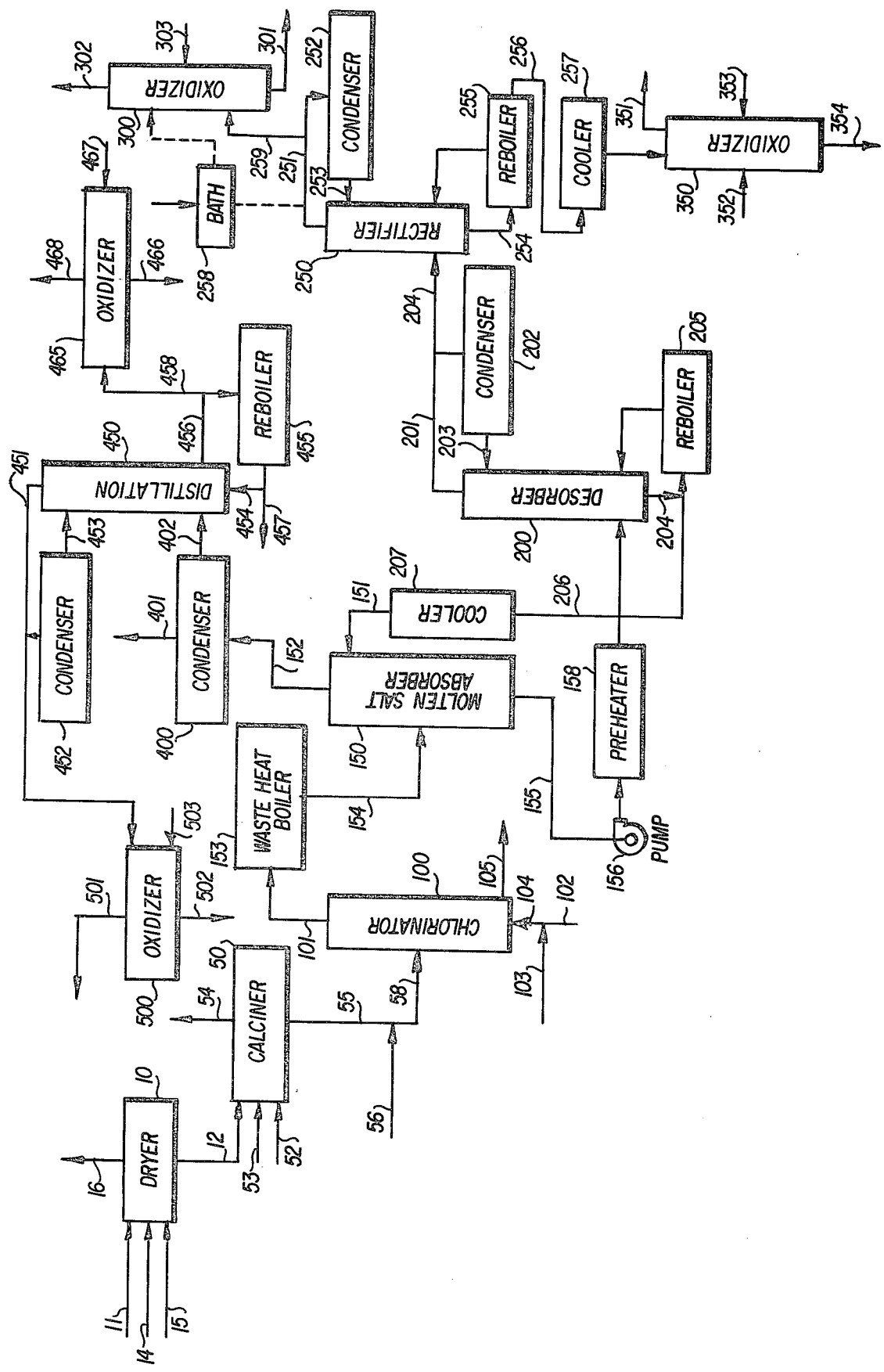

PROCESS FOR THE PRODUCTION OF ALUMINUM CHLORIDE AND RELATED PRODUCTS

BACKGROUND OF THE INVENTION

The Bayer-Hall process has been virtually the only process used for the commercial production of aluminum for the nearly 100 years since these processes were invented. The Bayer process to make alumina, which is electrolyzed in the Hall process to make aluminum metal, requires the use of high grade bauxites. The United States today is 92% dependent on the importation of bauxite for the operation of its current aluminum plants. The prices for this bauxite have increased nearly five-fold in the last two years and there exists an element of uncertainty of continued dependable supply because of political and economic situations abroad.

It is therefore very much to the interest of the United States and many other countries worldwide to be able to economically make alumina for the current Hall aluminum process plants from respective domestic ores. For instance, there is an established reserve of Georgia kaolin clay with sufficient alumina content to supply the domestic aluminum industry for over 500 years. Progress has been made on research on extraction of alumina from abundant clays with some pilot plants announced but said work has been limited to the use of mineral acids, nitric, hydrochloric and sulfuric, and all these processes cost considerably more than the Bayer process in both capital and manufacturing costs even with the higher bauxite costs prevalent today.

Additionally, the Hall process requires exorbitant amounts of electrical energy, a factor acting as a serious barrier to the growth of the domestic industry. Licenses for new plants have been denied in view of the power crunch. Older plants have had difficulty in maintaining production.

Two new aluminum-making process claims to use much less power. One process is being piloted by Alcoa and involves the direct electrolysis of aluminum chloride made by chlorination of Bayer alumina. The lowest power Toth process makes aluminum in a chemical manner by reacting the aluminum chloride with manganese metal to make aluminum metal and manganese chloride, the latter then being recycled into its component elements. This process, too, uses aluminum chloride.

Therefore, there exists a crying need for the development of a process that would be able to make from abundant domestic ores metallurgical grade aluminum chloride in anticipation of these newer aluminum developments with lower power costs, and also being able readily to convert that aluminum chloride to alumina for the current Hall plants and should that process somehow continue to be the modus operandi. The term metallurgical grade means a material of sufficient purity from which aluminum metal could be made of quality equal or superior in quality to that produced by the Bayer-Hall process.

The present invention comprises a process to make pure aluminum chloride and/or pure alumina fully of metallurgical grades from domestic clay, and furthermore can advantageously utilize high and low grade bauxites and other aluminous ores present in certain parts of the United States and in many countries abroad to promote competitive raw materials for supplying this and other countries.

The primary purpose of this invention is to make pure aluminum chloride and/or pure alumina in accordance with the current and future demands of the aluminum industry from abundant aluminous ores and in economic competition and superior to the Bayer process. Ecology of the present invention is devoid of the problems of the Bayer process problems like disposal of large volumes of caustic red mud. The residues of the current invention are dry solids readily disposable.

While much data on various independent chlorinations and purifications of aluminous ores have been known from the prior art, some by the current inventors, there has not been developed and demonstrated a total process to achieve the required urgently needed objectives of the current invention for the economic production from domestically abundant clay and other widespread aluminous ores, of aluminum chloride and/or alumina of satisfactory purity and economy required by the current and upcoming aluminum manufacturing plants.

SUMMARY

The present basic process involves two principal steps comprising:

(1) drying, calcining and carbo-chlorinating the aluminous ore to produce a mixed chloride gas comprising primarily $AlCl_3$, $FeCl_3$, $SiCl_4$, $TiCl_4$, $CO$ and $CO_2$; and (2) selectively absorbing the $AlCl_3$ and $FeCl_3$ contained in the mixed chloride gas in a molten salt solvent, preferably a $NaCl$-$AlCl_3$ system, wherefrom the $AlCl_3$ and $FeCl_3$ are subsequently recovered by vaporization and then separated from each other by rectification, passing the aluminum chloride through a suitable metallic solvent, preferably aluminum metal to remove trace impurities and thereafter condensing the aluminum chloride.

By-produce recovery which is preferably conducted as follows: the pure $FeCl_3$ produced in step (2) is oxidized to recover the chlorine; the $SiCl_4$ and $TiCl_4$ are condensed from the undissolved gases evolved from step (2) and separated from each other by rectification; and $SiCl_4$ is oxidized to recover the chlorine. The $TiCl_4$ is utilized as such to make titania or titanium metal ore which can be oxidized to make titania pigment and the chlorine recovered.

A preferred embodiment of the present invention comprises the additional step of oxidizing the aluminum chloride to produce metallurgical grade alumina and the generated chlorine is recycled.

Among the distinct advantages and features of the present process are:

1. The process of the present invention provides for the first time, lower capital and manufacturing costs for making aluminum chloride and alumina than the costs for making those products via the conventional commercial Bayer process.

2. The process of the present invention can utilize a wide range of abundant aluminous ores which would render aluminum manufacturing in the United States and many other countries independent of costly imported high grade bauxite required by the current Bayer-Hall process.

3. The process of the present invention recovers valuable by-products like titanium chloride from domestic ores to render the important titanium-titania domestic industry more economical and independent of imported ores.

4. Data have been published on two new aluminum making processes (Alcoa and Toth) using aluminum chloride. The process of the present invention in one of its preferred embodiments produces aluminum chloride as a precursor to alumina and so could most economically also supply aluminum chloride for these new processes.

5. No exceptional ecological problems are apparent because the solid residues from the process of the current invention are dry and inert.

DESCRIPTION OF THE DRAWING

The above features and advantages of the instant invention will be apparent to one skilled in the art in light of the details of the present process as shown in the drawing and described in the ensuing detailed disclosure of its preferred embodiments which are particularly pointed out in the appended claims.

The drawing represents an overall schematic flow diagram of the present invention illustrating the four principal steps, each step being shown with its own characteristic shading. Each principal step is further broken down into the various preferred processing operations also reflected in the drawing and described in detail below.

DESCRIPTION OF THE PREFERRED EMBODIMENT(S)

In its most rudimentary form, the instant invention comprises a process for the production of metallurgical grade aluminum chloride and valuable by-products from aluminous ores, such as clay, bauxites, laterites, and the like, by carbo-chlorination of such ores whereby aluminum chloride and other chlorides are produced. The aluminum chloride is separated and purified. The other metal chlorides are processed to recover selected by-products. As a preferred embodiment, the aluminum chloride is oxidized to produce metallurgical grade alumina.

The present process in its broadest scope for the production of alumina which represents an especially preferred embodiment comprises the three following distinct steps, (1) drying, calcining and carbo-chlorinating of the ore source to produce a mixed chloride gas stream containing primarily $AlCl_3$, $FeCl_3$, $SiCl_4$, $TiCl_4$, $CO$ and $CO_2$;

(2) selectively dissolving or absorbing the $AlCl_3$ and $FeCl_3$ in a molten salt solvent feed wherefrom the $AlCl_3$ and $FeCl_3$ stream is generated by vaporization from the solvent in an absorber or concentrator and then separating $FeCl_3$ from $AlCl_3$ by rectification in a rectification or distillation column (3) oxidizing of the pure $AlCl_3$ to produce the metallurgical grade alumina end product, the generated chlorine being recycled.

Recovery of by-products is as follows:

The pure $FeCl_3$ stream produced in step (2) above is oxidized in an oxidizer to recover the chlorine values; the $SiCl_4$ and $TiCl_4$ stream is condensed in a condenser from the undissolved gases $CO$, $CO_2$ and the like evolved from step (2) and separated from each other in a rectifier; and the $SiCl_4$ stream realized from the distillation step is oxidized to recover the chlorine values.

The following represents a detailed description of the present process and will be described in conjunction with the overall schematic arrangement of the various steps as depicted in the drawing. In the following explanation, the various steps illustrated in the drawing and suitable process equipment are discussed under the designated paragraphs.

Typical ores for use in the instant process analyze broadly according to the following tabulation;

| COMPONENT | CLAY WEIGHT % | JAMAICAN BAUXITE WEIGHT % | FERRUGINOUS BAUXITE WEIGHT % |
|---|---|---|---|
| $Al_2O_3$ | 37 | 50 | 35 |
| $Fe_2O_3$ | 2.5 | 20 | 37 |
| $TiO_2$ | 2 | 3 | 5 |
| $SiO_2$ | 45 | 2 | 3 |
| Loss on Ignition | 13 | 24.5 | 19 |
| Other | 0.5 | 0.5 | 1 |

Drying and Calcining

In the first step of the process the free and combined moisture are driven off the raw crushed ore 11 in the dryer 10 and the calciner 50.

The typical mined ore feed stream generally with a free moisture content of about 5-20% is first sliced or crushed and then screened (½ inch (1.27 cm) mesh). Larger particles separated therefrom are recycled through a crusher (not shown).

The crushed screened ore feed 11 is first dried in the dryer 10, preferably a fluidized bed type of dryer, but any suitable form of conventional ore dryer can be employed. The ore 11 is dried preferably at a temperature generally less than about 150°-200° C. In any event, the ore is heated sufficiently to drive off at least the free water to about 5% by weight or less. The ore 11 is dried either: (a) by passing through the ore, hot gases developed by direct combustion of fuel source 14 with air source 15 in a bed or ore in the dryer 10; (b) by hot combustion gases generated by burning fuel source 14 with air source 15 in a furnace (not shown) and then mixing the hot gases with the ore in the dryer; or (c) by hot gases evolved from the calciner 50 fed into dryer 10. Coal or lignite is the preferred fuel source though oil is suitable.

The hot dry ore 12 from the drying operation is then conveyed to the calcination step described in detail below. The spent drying gases from the drying operation are eventually separated from solids and discharged as off-gas 16. Such gases can be employed elsewhere in the process to recover any heat value thereof.

The dried ore 12 is then fed to calciner 50 maintained at a temperature suitable for removing any combined and chemisorbed water. As an example, for the preferred kaolinic clays and bauxites employed in the present process a preferred temperature will be within the range from about 650° C to about 1000° C, preferably around 750° C. Temperatures required for the treatment of other usable ores are reported in the literature. Pressures are not critical so the drying and calcination are at essentially atmospheric pressure. The heat source for calcination will preferably be provided by burning the fuel 53, like coal or lignite for example, with the air 52 in contact with the ore feed 12, preferably in a fluid bed type of apparatus. The off gases 54 remaining after calcination of the ore can also be utilized in some suitable form or fashion elsewhere in the process to salvage its heat value.

The calcined ore 55 realized from the calcination operation is next fed with the reductant source 56 for chlorination in the manner described below. The reductant source 56 can comprise coal, coke, fuel oil, cokes and chars derived from such sources as petroleum, coal, lignite, or char (including lignite char), viz. any readily commercially available carbon source suitable for use as a reductant in a carbo-chlorination reaction. Suitable ore calciners, preferably a fluidized bed type, are readily available in the art.

Ore Chlorination

The calcined ore 55 is mixed with the carbon source 56, preferably a char or coke, to produce the resultant ore and carbon mixture 58 which is then fed to the chlorinator 100 which is a refractory lined vessel wherein the calcined ore-carbon mixture is chlorinated. The temperature in the chlorinator is established for optimization of the reaction rate, the degree of completion of the reaction, and the minimization of carbon consumption. The temperature range is from about 650° C to 1000° C, preferably at about 750°–950° C for clay and at about 650°–850° C for bauxite. The ore-carbon mixture is preferably fluidized within the chlorinator 100 by virtue of the gaseous feeds of recycle chlorine 102 and chlorine makeup 103 and the gases formed from the chlorination reaction, comprising CO, $CO_2$ and vaporized metal chlorides fed into the chlorinator 100 at some point beneath the ore. For convenience, the chlorine feed 102 can be first mixed with the recycle chlorine 103 for introduction as a single stream 104 into the chlorinator 100. The recycle chlorine stream 104 comprises various sources of chlorine originating as described in detail below and realized by oxidation of the aluminum chloride, silicon chloride and ferric chloride, and accordingly, will contain some oxygen and nitrogen, inter alia. The make-up chlorine 102 is sufficient to replace chlorine losses in the system. During chlorination, a small amount of unreacted ore residue 105, inter alia, is preferably removed from the chlorinator 100 continuously or intermittently to prevent its build-up therein.

About atmospheric pressure is preferred, since this is most readily practiced commercially and lower or higher pressures offer disadvantages.

The carbo-chlorination of metallic ores per se is old and well known in the art. Such an ore reaction basically comprises reacting an ore source with carbon and generally elemental chlorine to produce corresponding metallic chlorides and carbon oxides. Various types of chlorinators are available in the art in which the present chlorination step can be practiced, e.g., a shaft furnace, fluid bed reactor, rotary reactor and the like.

Absorption of Aluminum and Iron Chlorides in Molten Salts

The chlorinator off-gases 101 contain essentially aluminum chloride, ferric chloride, titanium chloride, silicon chloride, carbon monoxide and carbon dioxide. The off-gas stream 101 is passed through the waste heat boiler 153 to cool it from the temperature of chlorination, generally about 925° C, down to about 225° C. The waste heat boiler 153 is a conventional tubular type of heat exchanger wherein the mixed chloride gas flow is on the shell side and the water flows through the tubes wherein steam is generated. The waste heat boiler 153 is provided with a steam superheater (not shown) at the gas inlet. The superheated steam thus generated is available for use during other phases of the present process. The cooled process stream 154 leaves the boiler 153 in gaseous form. High boiling metal chlorides like $CaCl_2$ and $MgCl_2$ are condensed in the waste heat boiler 153.

The waste heat boiler 153 could also be of the fluidized bed type in which solid inert particles would be fluidized by the mixed chloride gases entering the bottom portion of the vertical cylindrical vessel. The vessel has internal cooling tubes installed in its upper part so that the fluidized particles are cooled by the tubes, then contact the incoming mixed chloride gases to cool same and condense out and solidify the high boiling point chlorides on the cool solid particles. Hence, when those hot solid particles are subsequently in free flow contact and are cooled by the cooling tubes, there would be no molten salt to deposit on to foul or corrode the tubes. Steam would be generated within the tubes. The inert particles could be made of alpha alumina. A high temperature boiler with a steam superheater could be employed before the fluidized bed cooler, as very little condensation would occur at higher temperatures 600°–950° C.

The cooled mixed chloride gases 154 leaving the boiler 153 are fed directly into the absorption column 150 wherein they are countercurrently contacted by the molten salt solvent 151 preferably a sodium chloride-aluminum chloride salt solvent, fed near the top into the absorber 150 as shown in the drawing. The molten salt solvent 151 enters the column 150 at a temperature within the range of from about 115° C to about 185° C, generally at or about 120°–130° C, cools the mixed chloride gas stream 154 flowing countercurrently thereto and preferentially absorbs or scrubs out the aluminum chloride and ferric chloride from the mixed chloride gases 154. The condensed aluminum chloride and ferric chloride are dissolved by the solvent 151 to form a liquid sodium chloride, aluminum chloride, and ferric chloride mixture. The latter-mixture comprises the absorber bottoms 155 which at a temperature of about 185°–190° C is pumped out of absorber 150 by the pump 156. The remaining gas 152 comprising titanium chloride, silicon chloride and carbon oxides exit the top of the absorber 150 at a temperature of approximately 125° C. The absorption column 150 pressure comprises any suitable type of countercurrent gas-liquid contactor as available in the art, however, preferably a packed column or a sieve tray type column. The capacity of the absorption column 150 to the mixed chloride gases 154 and to remove the heat of condensation could be increased by the inclusion of internal cooling tubes (not shown).

Desorption of Aluminum and Iron Chlorides from Molten Salt Solvent

The absorber bottom 155 is drawn from absorber 150 by pump 156 which maintains a discharge pressure sufficient to keep some aluminum chloride liquid, which would be generally at least about 3 atmospheres and preferably of about 4 atmospheres that is required for subsequent liquefaction, rectification and separation of $AlCl_3$ and $FeCl_3$ from the solvent in desorber 200 and of $AlCl_3$ and $FeCl_3$ in the rectifier 250. $AlCl_3$ sublimes at about 183° C and exists as a liquid only at 2½+ atmospheres pressure above about 190° C.

The molten solvent containing the dissolved $AlCl_3$ and $FeCl_3$ is pumped into preheater 158 wherein a temperature of about 350° C is attained. The preheater 158 is a conventional tubular type of heat exchanger wherein the process liquid stream 155 preferably passes through the tube side and a high temperature heat transfer liquid through the shell side.

The pressurized preheater liquid stream from preheater 158 enters the desorber 200 which comprises a rectifying column in which the previously absorbed aluminum chloride and ferric chloride are expelled as overhead stream 201 from the $NaCl.AlCl_3$ solvent. Part of this overhead vapor stream 201 is condensed in the condenser 202 at about 210°–400° C, preferably at about 305° C and returned as the column reflux stream 203.

The desorber 200 is preferably a conventional sieve tray rectification column. The salt solvent bottoms in the desorber column 200 is discharged as stream 204. Part of stream 204 is passed into the reboiler 205 comprising a kettle type heat exchanger operating preferably at about 430° C. The heated solvent then enters the desorber 200 to supply required heat thereto. As in the preheater 158, a high temperature heat transfer liquid at preferably about 800° C is the heating medium on the shell side. Part of the stream 204 flows as stream 206 into cooler 207, a conventional tube-in-shell heat exchanger, wherein it is cooled to about 120°–130° C.

Aluminum Chloride-Iron Chloride Separation

The other part of the $AlCl_3$—$FeCl_3$ vapor stream 201 evolved from the desorber 200 is fed as stream 204 to the rectification column 250 operating at 3–4 atmospheres pressure for separation of the $AlCl_3$ and $FeCl_3$. Part of the $AlCl_3$ vapor evolved overhead as stream 251 passes through the condenser 252 operating preferably at about 225° C where the condensate is returned to the column 250 as flux 253. The balance of stream 251 is removed as the vapor stream 259 at about 225° C. The $FeCl_3$ separated is taken off as the bottoms stream 254 of the column 250 through the reboiler 255 operating at about 430° C. Part of the heated $FeCl_3$ from the reboiler is fed to rectification column 250 to supply required heat while the rest, representing the $FeCl_3$ produced in the chlorination steps is discharged as stream 256 into air cooler 257 in preparation for oxidation.

$AlCl_3$ Oxidation

Part of the $AlCl_3$ vapor stream 251 leaving the $AlCl_3$—$FeCl_3$ rectifier 250, identified as stream 259 and corresponding in weight approximately to the $AlCl_3$ generated in the chlorinator, is fed directly to the fluid bed oxidizer 300 operating at essentially atmospheric pressure and at a temperature preferably of about 900° C to produce the high grade alumina end product 301 and the chlorine by-product 302 for recycle to the chlorinator 100. The oxidation is effected with oxygen stream 303 fed to the bottom of the preferably fluid bed oxidizer 300 and with alumina particles being fluidized by the oxygen feed 303 and product chlorine gas with some $O_2$ and $N_2$ removed from the oxidizer in off-gas stream 302. These materials are taken through a refractory lined cyclone separator (not shown) for removal of any solids before recycling to the chlorinator 100. The end product alumina 301 in powder form is removed from the reactor through a dip leg (not shown), then cooled and conveyed to storage silos.

The oxidizer is preferably a vertical cylindrical vessel having a refractory-lining, an oxygen distributor plate and $AlCl_3$ feed nozzle (not shown).

The end product alumina 301 readily agglomerates to make coarse flaky-free flowing and non-dusting particles which are readily soluble (up to 8%) in molten cryolite at 950° C to meet the solubility conditions for use in a Hall cell. The bulk density can be increased if necessary to 62 pounds per cubic foot.

Trace Impurity Removal

Under some conditions, a final purification of $AlCl_3$ stream 259 is necessary to remove any trace impurities that may be contained therein. Thus the $AlCl_3$ overhead vapor stream 259 from the $AlCl_3$—$FeCl_3$ rectification column 250 would be bubbled through a bath of a molten metal with greater chlorine affinity than the element (other than chlorine) in the chloride impurity to be removed, and the chloride of the bath metal must not be significantly vaporized into the effluent aluminum chloride except when employing aluminum as the purifying metal. In fact, aluminum metal offers the distinct advantages of a low melting point, removal of most of the trace impurities normally encountered in most ores, and the generation of more desired aluminum chloride, upon reaction with the impurity chlorides, hence represents the preferred bath metal. As the purification proceeds, the composition of the bath metal includes increasing amounts of other elements, usually principally metals, generated from the reacted impurity chlorides but this does not substantially reduce the effectiveness of the bath metal until sufficient reaction products with bath metal are made to make the bath too viscous and unreactive. Most of the impurity metals collected in the bath metal have considerable value to be recovered. When employing molten aluminum 258, the temperature preferably ranges between about 700° to about 800° C whereby residual trace impurities such as $VCl_5$, $SnCl_2$, $CaCl_2$, $TiCl_4$, $SiCl_4$, $FeCl_3$, $NiCl_2$, $CrCl_3$, $CuCl_2$, $MnCl_2$, $ZnCl_2$, and the like would be reduced to form their respective metals and $AlCl_3$. For instance, the level of impurities reducible by molten aluminum is reduced to meet specifications of metallurgical grade alumina as in the analysis below based on equivalent $Al_2O_3$.

| Element | Result |
|---|---|
| $SiO_2$ | 0.011 |
| $Fe_2O_3$ | 0.002 |
| $CaO$ | 0.028 |
| $NiO$ | 0.001 |
| $CuO$ | <0.001 |
| $MnO_2$ | <0.001 |
| $TiO_2$ | <0.001 |
| $ZnO$ | <0.01 |
| $V_2O_3$ | <0.003 |
| $Cr_2O_3$ | <0.003 |
| $P_2O_5$ | <0.01 |

The purifying metal bath is run at or near atmospheric pressure with the force required to drive the vapors to be scrubbed through the metal bath by a positive force on the upstream side and/or a negative force on the donwstream side.

If alumina is desired, the $AlCl_3$ vapor discharged from alumina treatment 258 is passed to and oxidized in the oxidizer 300 similar to oxidation of stream 259.

Suitable apparatus for the above operation would be similar to the current commercial apparatus for production of $AlCl_3$ by chlorination of molten aluminum. The reactor consists of a container like a bath-tub made of sheet steel with a high-alumina ceramic lining. The reactor-tub is divided across the middle by a ceramic bridge over which molten aluminum metal flows into the reaction compartment wherein the aluminum chloride vapors are blown through the molten aluminum metal. The reactor compartment is purged periodically to remove accumulated trace metals and impurities. The bath is heated by conventional methods.

$FeCl_3$ Oxidation

The liquid $FeCl_3$ stream 256 from the $AlCl_3$—$FeCl_3$ reboiler 255 is cooled preferably to 250° C and solidified in the conventional air cooler 257 then ground and fed along with oxygen stream 353 to the oxidizer 350, preferably a fluid bed oxidizer operating at 525° C. The solids are fluidized from the oxygen feed 353 and by product primarily chlorine off-gas 351 which is recycled to the clay chlorinator 100. The $Fe_2O_3$ by-product 354 is conveyed to storage after cooling.

Pure ferric oxide enjoys profitable markets for pigments, ferrites, reduction to make pre-reduced iron metal, and iron powder metallurgy applications. Some of the $FeCl_3$ also could be used directly in sewage treatment.

$SiCl_4$—$TiCl_4$ Condensation

The gaseous $SiCl_4$, $TiCl_4$, CO, and $CO_2$ 152 leaving the Molten Salt Absorber 150 is cooled, to about $-35°$ C to about $+15°$ C preferably about $-25°$ C, by the refrigerated condenser 400 in order to condense the $SiCl_4$ and $TiCl_4$ from the CO and $CO_2$. The CO—$CO_2$ and any other non-condensables 401 are flared and scrubbed as necessary to limit air pollution. The liquid $SiCl_4$—$TiCl_4$ 402 is pumped to a distillation column 450 for separation.

$SiCl_4$—$TiCl_4$ Separation

The $TiCl_4$ and $SiCl_4$ liquid stream 402 is rectified in columns 450 for separation. The more volatile $SiCl_4$ is evolved overhead as the vapor stream 451 which is split, part through the condenser 452 to produce the reflux stream 453 which is recycled to the column 450.

Liquid $TiCl_4$ stream 454 is taken from the column bottoms. Part of $TiCl_4$ stream 454 is passed through reboiler 455 heated to 155° C and recycled as stream 456 to rectification column 450 to supply heat required therein. A part of stream 454 and stream 457 may be cooled and utilized as such or to make $TiO_2$ pigments and titanium metal elsewhere in the manner well known in the art.

$TiCl_4$ Oxidation

Some of stream 454 in addition to that used for recycle as stream 456 also might, however, be passed through the reboiler 455 and pumped directly into the $TiCl_4$ oxidizer 465 for production of $TiO_2$ powder pigment taken off through leg 466 for storage and sale. Oxygen stream 456 also is fed to the preferably fluidized bed oxidizer 465. Chlorine produced is removed as off-gas stream 456 and recycled to chlorinator 100.

$SiCl_4$ Oxidation

That part of the $SiCl_4$ vapor stream 451 leaving the $SiCl_4$—$TiCl_4$ separator 450 and not fed to condenser 452 is fed directly to the oxidizer 500 along with oxygen stream 503, the oxidizer 500 being operated at a temperature of preferably about 925° C to produce by-product $SiO_2$ 502 and chlorine 501 for recycle to the chlorinator 100. The oxidizer 500 is preferably a fluid bed reactor with solid silica particles fluidized with the oxygen 503 fed to the bottom of the oxidizer and by the chlorine gas product. The $SiO_2$ end product 502 in powder form is removed from the reactor 500 through a dipleg (not shown) and is then cooled and conveyed to disposal. The oxidizer off-gas 501 is taken through a cyclone separator (not shown) for removal of solids before recycling to the clay chlorinator 100.

It will be apparent to one skilled in the art that various changes and modifications can be made within the ambit of the present invention without departing from its true scope and spirit. For example, such parameters as its adaption to a semi-continuous operation, the specific type of reaction equipment employed, the method of treating the reactants, operating temperature and pressures, and the like can vary within a reasonable scope while still achieving the basic objectives of the present invention. Accordingly, while we have described what we believe to be the best embodiments of our invention, we however, do not wish to be confined within those embodiments and the enumerated example which are only illustrative of our invention and what we desire to cover by Letters Patent is as set forth in the appended claims.

What we claim as our invention is:

1. A process for the production of aluminum chloride comprising the following steps:

A. carbo-chlorinating at up to 1,000° C a dehydrated iron containing aluminous ore to produce a mixed chloride gas stream comprising primarily aluminum chloride, iron chloride, (other metal chloride) titanium cloride, silicon chloride, vaporous components and carbon oxides; and B. extracting the aluminum chloride and iron chloride components out of the mixed chloride gas stream by contacting the stream with a liquid metal chloride solvent in which the aluminum chloride and iron chloride are soluble to preferentially dissolve the aluminum chloride and iron chloride, then distilling the aluminum chloride and iron chloride from the liquid metal chloride solvent, subsequently separating the aluminum chloride from the iron chloride by rectification to obtain essentially aluminum chloride, and contacting the aluminum chloride with molten aluminum capable of reacting with impurity chlorides to form compounds that will not contaminate the aluminum chloride effluent to obtain aluminum chloride.

2. The process of claim 1 further characterized as comprising the additional step of:

oxidizing the aluminum chloride with a source of oxygen to produce alumina as an end product.

3. The process of claim 1 further characterized in that:

said aluminous ore is selected from the group consisting of: clay, bauxite or laterite.

4. The process of claim 1 further characterized in that:

said aluminous ore comprises kaolinitic clay.

5. The process of claim 1 further characterized in that:

said aluminous ore is dehydrated by heating before chlorination.

6. The process of claim 1 further characterized in that:

said aluminous ore is carbo-chlorinated in a fluid bed reactor at a temperature of about 150° C to 1000° C.

7. The process of claim 6 further characterized in that:
said liquid metal chloride solvent comprises sodium chloride and aluminum chloride.

8. The process of claim 7 further characterized in that:
the mixed chloride gas solvent is at a temperature of 115° C to 185° C and thereafter separated from the liquid metal chloride solvent at a temperature of 185° C to 190° C.

9. The process of claim 7 further characterized in that:
the mixture of aluminum chloride and iron chloride vapors separated from the liquid metal chloride solvent is subsequently separated at a temperature of from about 190° C to about 500° C to produce separate essentially pure aluminum chloride and iron chloride components.

10. The process claim 1 further characterized in that:
the absorbed iron chloride and aluminum chloride in the liquid metal chloride solvent are separated therefrom by rectification as a mixture at a temperature of 210° C to 500° C and at a pressure of about at least 3 atmospheres to maintain some of the aluminum chloride and iron chloride as liquids.

11. The process of claim 1 further characterized in that:
the metal chlorides and carbon oxides components of the mixed chloride gas stream from which the aluminum chloride and iron chloride mixture has been essentially separated are then subsequently cooled sufficient to phase separate out the silicon chloride and titanium chloride components as a mixture at a temperature within about minus 35° C to about plus 35° C.

12. The process of claim 11 further characterized in that:
the mixture of silicon chloride and titanium chloride are phase separated from the carbon oxide gases is subsequently rectified at a temperature of from about minus 35° C to about plus 15° C to produce essentially separate silicon chloride and titanium chloride components.

13. The process of claim 9 further characterized in that:
the essentially pure iron chloride component is oxidized to recover its chlorine and iron values.

14. The process of claim 12 further characterized in that:
the essentially silicon chloride component is oxidized to recover its chlorine and silica values.

15. The process of claim 9 further characterized in that:
the essentially pure titanium chloride component is oxidized to recover its chlorine and titania values.

* * * * *